United States Patent [19]
Best et al.

[11] 3,798,912
[45] Mar. 26, 1974

[54] ARTIFICIAL ISLANDS AND METHOD OF CONTROLLING ICE MOVEMENT IN NATURAL OR MAN-MADE BODIES OF WATER

[76] Inventors: John S. Best, 4121 Oaks Ct., Midland, Mich. 48640; Hubert Stacy Smith, 12 Center Ave., Essexville, Mich. 48732

[22] Filed: July 3, 1972

[21] Appl. No.: 268,467

[52] U.S. Cl............................ 61/1 R, 61/46, 62/260
[51] Int. Cl................................................. E02b 3/00
[58] Field of Search.......... 61/46, 50, 36 A, 1; 62/1, 62/260, 529, 439, 457; 99/192 R

[56] References Cited
UNITED STATES PATENTS

| | | | |
|---|---|---|---|
| 34,426 | 2/1862 | Howard | 61/46.5 |
| 2,960,832 | 11/1960 | Hayward | 61/46.5 |
| 2,775,079 | 12/1956 | Sarofeen | 99/182 |
| 3,680,330 | 8/1972 | Canosa | 62/457 |

OTHER PUBLICATIONS
"Ice Island For Arctic Drilling Proposed" in the Oil and Gas Journal pp. 60–61 September 14, 1970

*Primary Examiner*—Mervin Stein
*Assistant Examiner*—Alex Grosz
*Attorney, Agent, or Firm*—Arthur J. Young

[57] ABSTRACT

Mobile, nonpermanent, artificial islands and a method of utilizing the same to control the movement of natural ice formations in or near natural and man-made bodies of water such as lakes, rivers, sounds, straits, bays, shipping channels, harbors and the like. The artificial islands are formed from structures having body cavities which are substantially filled with a liquid composition which freezes to form an ice-like solid at a temperature higher than the freezing temperature of the body of water in which they are positioned, thus rigidizing and firmly securing the structures to the bed of the body of water prior to the formation of natural ice in the body of water. During warm seasons the liquid composition melts allowing the artificial islands to be easily transferred to new positions, thus optimizing control of ice movement in any specific body of water at minimum cost.

14 Claims, 5 Drawing Figures

PATENTED MAR 26 1974 3,798,912

ARTIFICIAL ISLANDS AND METHOD OF CONTROLLING ICE MOVEMENT IN NATURAL OR MAN-MADE BODIES OF WATER

BACKGROUND OF THE INVENTION

1. Field of the Invention

This invention relates natural ice stabilizing structures and methods of controlling the movement of ice in natural or man-made bodies of water, with particular reference to mobile, nonpermanent, artificial islands and a method of utilizing the same.

2. Description of the Prior Art

As waterway systems are developed for man's use, the means used to control natural ice movement therein becomes an increasingly important factor of continued development. The adverse effects of winter ice in moderate or cold climate areas on natural and man-made bodies of water, such as the Great Lakes, far exceed the desire for uninterrupted use of the same for commercial shipping. Constantly, shifting ice can rip docks and pilings from their foundations, damage or destroy docked boats and damage beaches or retaining walls. In the spring, massive ice jams, ice build-ups commonly called gorging, often block channels and rivers and can actually stop the flow of water, causing extensive flooding in low-lying areas. Ice taken into the turbines of hydroelectric power plants can seriously reduce their efficiency or cause damage.

Ice begins to form when the air temperature is well below freezing and the water temperature is close to freezing. The most favorable conditions for ice formation are during a clear, cold night with little or no wind. Ice sheets form first in sheltered areas, such as harbors and bays. Wind and wave action cause parts of these sheets to break off into relatively small pieces, known as brash ice. This brash ice is driven into open water where it drifts together to form ice floes. The floes, in turn, accumulate and increase in size as the wind and waves separate them and draw them back together, where they eventually refreeze, becoming rigid fields of ice. When the ice fields break-up in the spring, wind and wave action can cause large packs of ice, referred to as gorg ice, to form in restricted areas such as rivers or shipping channels where severe damage may result, and shipping is impeded.

Extension of the navigation season or possible winter-long navigation as well as elimination of damage resulting from gorg ice requires maintenace of channels and rivers connecting larger bodies of water. In large bodies of water away from shore areas, the winter ice cover is rather thin or discontinuous and can be easily traversed. It is at harbor and channel entrances and in rivers that ice poses a major problem. Ice breakers have been used to keep channels and rivers open, but repeated passages in the same track can cause weakening and damage to side walls of channels and shore areas of rivers. Bubbler systems for airlifting warm bottom waters to the surface and dusting techniques to prevent ice formations have been used with varying degrees of success but are expensive to maintain and are useless in preventing severe gorging. Permanent rock filled log cribs and concrete structures, sometimes used in combination with log and chain ice booms, have been utilized with greater success to prevent ice gorging, but such systems are expensive, difficult to construct for optimum design against ice movement and, because of their initial permanence, may cause unnecessary restriction to ship movements.

SUMMARY

In general, the present invention provides a mobile artificial island and a method of utilizing the same to control the movement of natural ice formations in or near natural or man-made bodies of water such as lakes, rivers, sounds, straits, bays, shipping channels, harbors and the like. The artificial islands are formed from encapsulating structures having body cavities which are substantially filled with a liquid composition which freezes to form an ice-like solid at a temperature higher than the freezing temperature of the body of water in which they are positioned, thus rigidizing and firmly securing the structures to the bed of the body of water prior to the formation of natural ice in the body of water. The encapsulating structures for such artificial islands can be formed from metals such as steel, aluminum and the like; from resinous plastic materials such as polyolefins, polyesters, natural and synthetic rubbers and the like; or from any other known construction material which is capable of containing the liquid compositions used to fill the artificial islands. Combinations of construction materials such as metals and plastics may be used with benefit including reinforcing materials such as fiber glass, woven and nonwoven fabrics and the like.

DESCRIPTION OF THE PREFERRED EMBODIMENTS

A series of artificial islands can be used to keep channels and rivers from being inundated with floating ice caused by strong wind and wave action or natural currents. They may be placed in a body of water such that bridging between the islands of the natural ice will occur or may also be used as anchors for log and chain ice booms which will control the movement of natural ice. In like manner, the artificial islands may be used for supporting, locating and anchoring navigational aids, lights, horns, flags and the like.

While encapsulating structures of the artificial islands can be built at the functional site, they can also be built in dry dock and then transported to their functional sites with a minimum of on-site work required such as leveling resting places on the bottom of the body of water in which they are placed. This represents a significant economic advantage over permanent structures which require extensive on-site work and transport of dead load ballast or fill such as concrete, stone, gravel and the like.

The liquid compositions utilized in the artificial islands as fill or ballast can be mixed and placed in the encapsulating structures either on arrival at the functional sites or in dry dock prior to transporting the artificial islands to their functional sites. Transporting the artificial islands to their functional sites may be accomplished by tug boats, barges and the like. Flotation devices such as flotation collars and the like may also be used to float and stabilize the islands during movement of the same.

The liquid compositions utilized in the encapsulating structures of the artificial islands have the necessary characteristic of a freezing temperature greater than that of surrounding water in which the islands are disposed when such surrounding water has cooled to the extent that natural ice formations are present in the same. The compositions freeze to the full depth of the artificial islands, thus maximizing the structural strength of the islands and indirectly anchor the natural float ice to the bottom of the body of water in which the islands are positioned.

Many useful compositions are described in a copending application U.S. Pat. Ser. No. 268,465, filed July 3, 1972, and entitled "Aqueous Organic Heat-Sink Fluids" by Ewart C. Clarke and David N. Glew, which application is herein fully incorporated by reference. Examples of useful compositions found in the copending application are mixtures comprising 1 mole of tetrahydrofuran and 17 moles of water which composition freezes at about 4.4° C., 1 mole of cyclobutanone and 17 moles of water which composition freezes at about 0.6°C., 1 mole of tetrahydrofuran plus 1 mole of 2,5-dihydrofuran and 34 moles of water which composition freezes at about 2.0° C., 1 mole of tetrahydrofuran plus 1 mole of 1,3-dioxolane and 34 moles of water which composition freezes at about 1.0° C., 1 mole of pinacol and six moles of water which composition freezes at about 45.0° C., and 1 mole of butane-2,3-diol and 6 moles of water which composition freezes at about 14.0° C.

Two other beneficial properties of many of the organic compositions described in the above-identified copending application are densities higher than water which contributes to the dead weight of the islands and relatively low expansion or contraction of the compositions during freezing which significantly reduces mechanical stress on the encapsulating structures. Concrete, stone, gravel and the like may be used in combination with the liquid compositions in the islands to increase the dead weight thereof.

During use of artificial islands to control natural ice movement, the liquid compositions in the encapsulating structures freeze to form an ice-like solid, thus allowing the islands to become functional long before natural ice forms in the surrounding body of water. This maximized structural function is retained until after the natural ice melts in the spring. As the year proceeds into summer the compositions in the encapsulating structures are subject to melting, thus allowing easy, economical removal of the islands to temporary storage areas thereby removing their restrictive effect on ships during the peak summer navigation period. During early fall, before the liquid hydrate compositions freeze, the islands can be moved back into position or repositioned, if necessary, to obtain optimum control of natural ice movement during the coming cold weather season. This procedure can be repeated year after year.

Yet additional objects and advantages of the present invention are even more apparent when taken in conjunction with the accompanying drawings in which like characters of reference designate corresponding material and parts throughout the several views thereof, in which.

Figure 4:
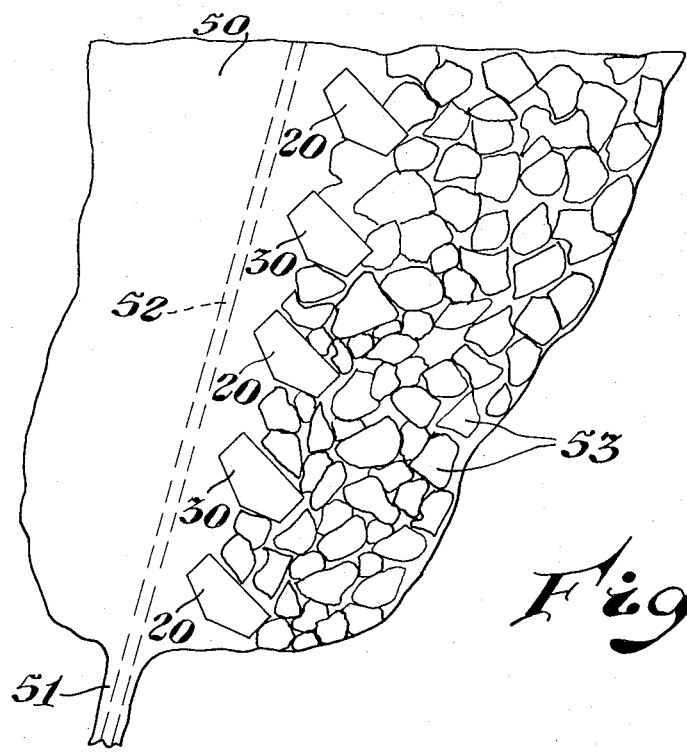
Figure 5:
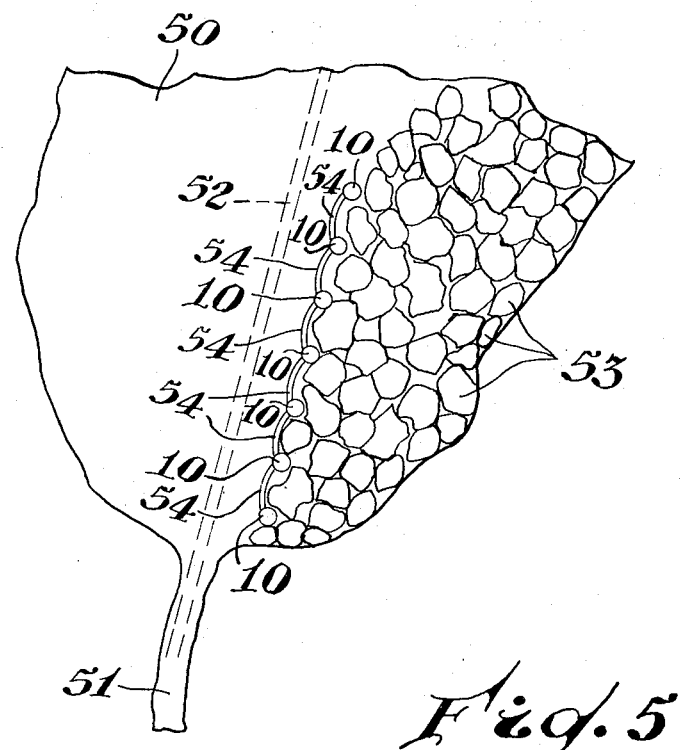

FIG. 4 is a fragmentary plan view illustrating the use of a series of artificial islands which restrict natural float ice movement into a channel or river from a large body of water by means of bridging of the natural ice between said islands; and FIG. 5 is a fragmentary plan view illustrating the use of a series of artificial islands as anchors for log and chain ice booms which restrict natural float ice movement into a channel or river from a large body of water.

The following description illustrates the manner in which the principles of the invention are applied but are not to be construed as limiting the scope of the invention.

Figure 1:
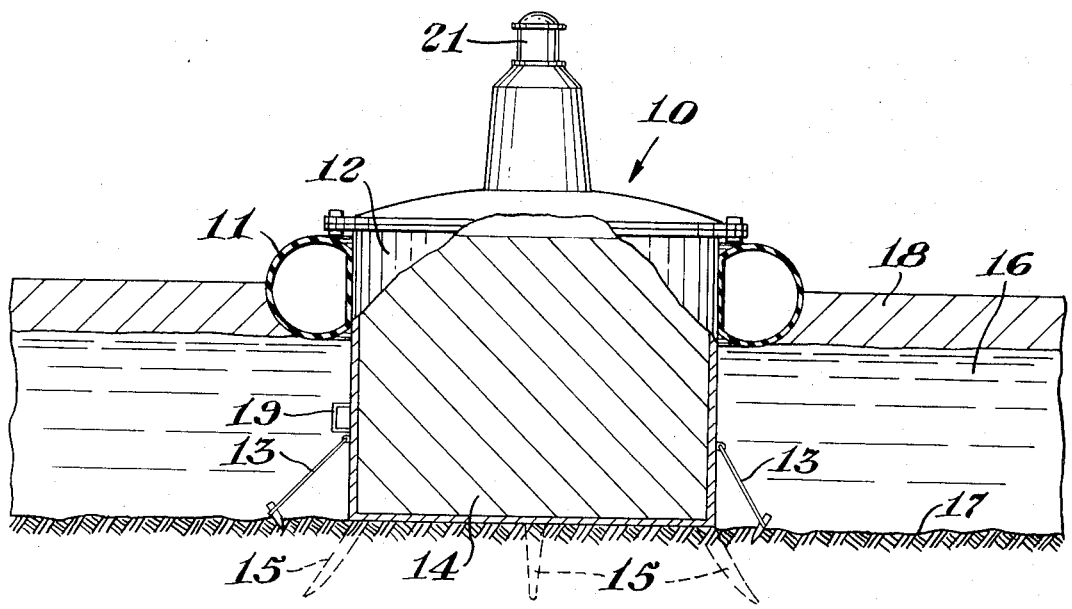
FIG. 1 is a partial cross-sectional view of an artificial island constructed according to the principles of the present invention.

More specifically referring to FIG. 1, an artificial island 10 having an encapsulating structure 12 formed from steel which contains an aqueous organic composition 14 is illustrated. The composition 14 can be a mixture of 1 mole of butane-2,3-diol and 6 moles of water which forms a solid hexahydrate having a freezing temperature of about 14.0° C. (57° F.). As illustrated in FIG. 1, the composition 14 is in its solid phase since the artificial island 10 is positioned in a body of water 16 which has a natural ice cover 18. The artificial island 10 also includes a flotation ring 11 formed from butyl rubber which can be removed or maintained permanently on the island 10 as an ice bumper, anchors 13 securing the island 10 to bottom 17 of the body of water 16, earth penetrating spurs 15 for additional anchor bearing capability, attachments 19 for connecting log booms, anchors and the like, and a navigational aid 21 such as a light or horn.

Figure 2:
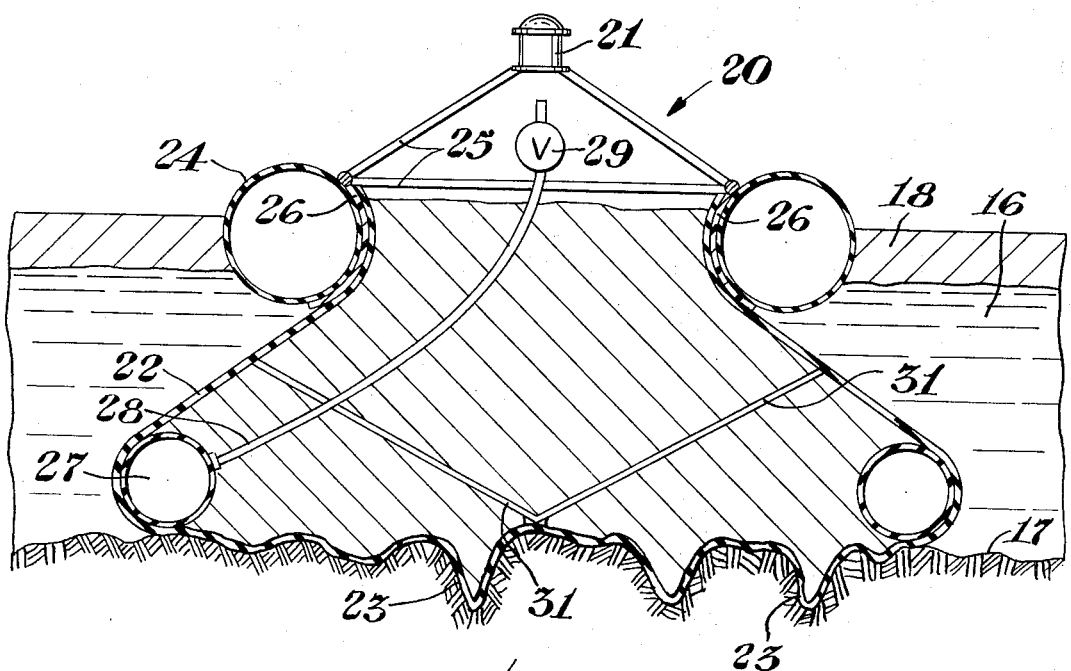
FIG. 2 is a cross-sectional view of a modified artificial island illustrating a flexible encapsulation structure.

Referring now to FIG. 2, a modified artificial island 20 having a flexible encapsulating structure formed from reinforced nylon and an oxidation resistant rubber such as neoprene or the like which contains an aqueous organic composition 14 is illustrated. The composition 14 can be the same mixture as that shown in FIG. 1 and, in like manner, is illustrated in its solid phase condition. The island 20 is positioned in the same body of water 16 having an ice cover 18 and bottom 17 as shown in FIG. 1. It should be noted that the flexible encapsulating structure 22 conforms to the bottom 17, as shown at 23, to provide positive anchoring thereto. However, additional anchors, not shown, can also be used to secure the island 20 to the bottom 17. The island 20 also includes a buoyancy collar 24 formed of reinforced butyl rubber or the like which also functions as an ice bumper, a rigid upper shaping structure 25 formed from steel or the like, an abrasion barrier 26 formed from polyethylene foam or the like, a buoyancy blatter 27 with a compressed air line 28 and valve 29 to aid in floating the island 20 into position, movement resistance straps 31 to help stabilize the island 20 and a navigational aid 21 such as a light or horn. Other attachments, not shown, for connecting log booms, anchors and the like may also be included.

Figure 3:
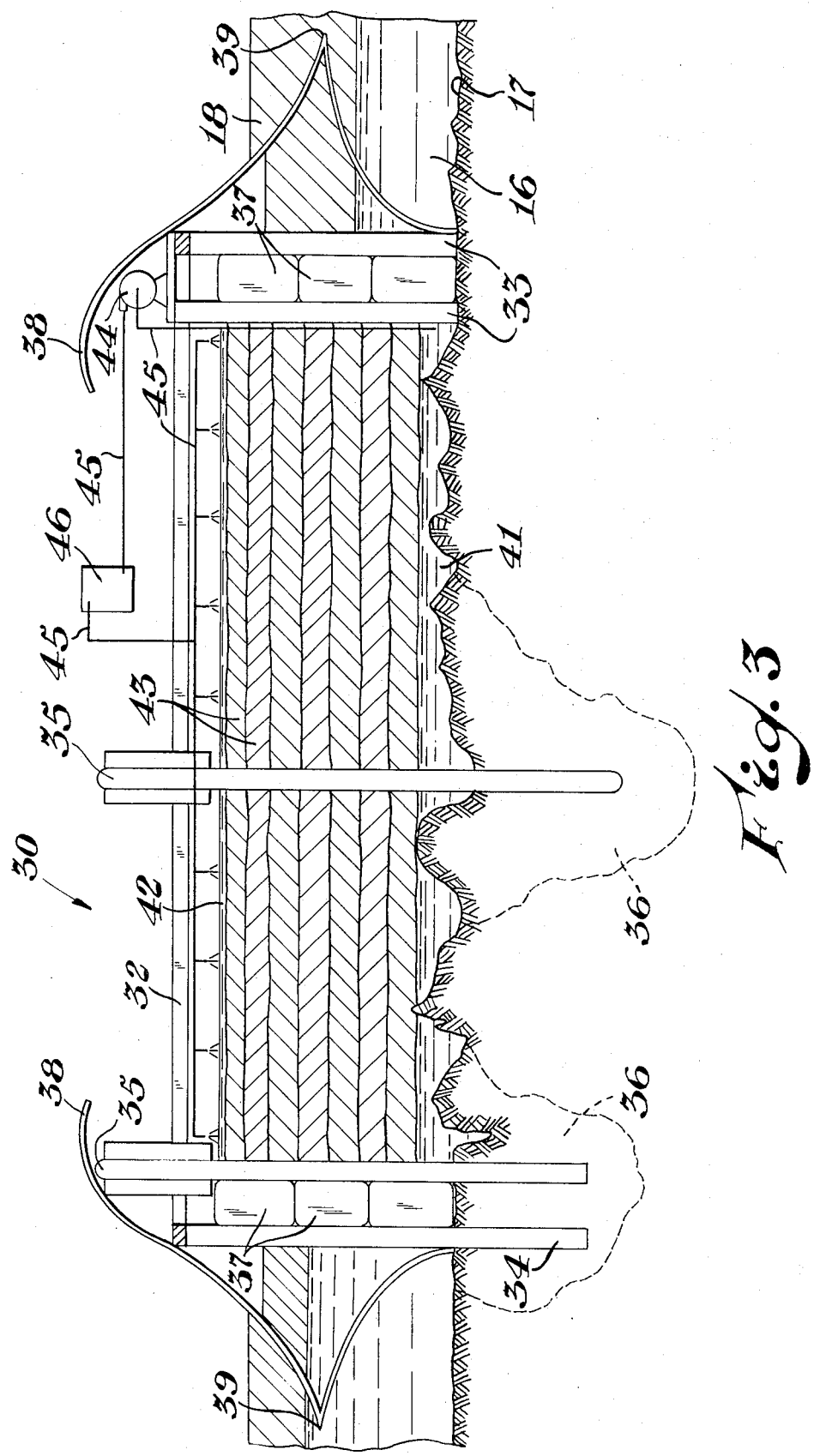
FIG. 3 is a cross-sectional view of a modified artificial island illustrating an encapsulating structure for a very large artificial island.

Referring now to FIG. 3, still another modified artificial island 30, useful where a relatively large functional structure is needed, is illustrated. The island 30 is positioned in the same body of water 16 having an ice cover 18 and bottom 17 as shown in FIGS. 1 and 2. The island 30 includes a retaining framework structure 32 which is secured to the bottom 17 by wooden or steel piles 33 which rest on the bottom 17, by driven piles 34 or by thermal piles 35. Thermal piles 35 contain an aqueous organic composition which freezes at less than 0° C.

(32° F.) and whose solid hydrate at its fusion temperature are more dense than the same liquid composition, thus providing for increased fixation of the retaining structure 32 to the bottom 17 by freezing of the earth around the bottom of the thermal piles 35, as shown at 36. The retaining framework structure 32 provides a crib which holds encapsulating bladders 37 filled with the aqueous organic composition described in FIGS. 1 and 2. The island 30 also includes an ice deflector 38 to relieve the pressure from the surrounding ice cover 18 on the retaining structure 32. The point 39 of the deflector 38 can be positioned under the ice cover 18, as shown on the left, or within the ice cover 18, as shown on the right. In both cases the ice forced over or under the deflector 38 will provide increased anchoring of the island 30 to the bottom 17.

As the surrounding ice cover 18 is formed in cold weather, trapped bottom water 41 in the island 30 can be intermittently pumped to the ice surface 42 where it freezes to form a series of contiguous layers 43. The bottom water 41 is pumped to ice surface 41 by the water pump 44 through distribution lines 45 and heat exchanger 46. Layers 43 are continuously formed until the island 30 is substantially filled with the same. Although not shown in FIG. 3, other anchoring means, attachments for connecting log booms and navigational aids can also be included in island 30.

FIGS. 4 and 5 are general representations of the manner in which islands 10, 20 and 30 can be used to control the movement of ice in a surrounding body of water. FIG. 4 illustrated a series of artificial islands such as islands 20 or 30, used in combination in various arrangements, one of which can be as shown, or which may be used separately, positioned in a large body of water 50 which is emptying into a river 51. A shipping channel 52 leading from the river 51 is illustrated by dotted lines. The islands 20 and 30 prevent pack ice 53 from blocking the entrance of the river 51 by natural bridging of the pack ice 53 between the islands 20 and 30. FIG. 5 illustrates the same type of restriction to pack ice 53 as FIG. 4, except that artificial islands such as islands 10 are used in conjunction with log and chain ice booms 54.

While certain representative embodiments and details have been shown for the purpose of illustrating the invention, it will be apparent to those skilled in the art that various changes and modifications can be made therein without departing from the spirit and scope of the invention. For example, the artificial islands of the present invention can be made in an infinite variety of configurations and sizes and can be used in any suitable manner to control the movement of natural ice in a body of water.

What is claimed is:

1. A mobile artificial island useful for controlling ice movement, supporting navigational aids and the like in natural or man-made bodies of water, said island comprising an encapsulating structure having a body cavity substantially filled with a chemical composition other than the surrounding water which freezes to form an ice-like solid at a temperature higher than a temperature necessary for the formation of natural ice in the body of water substantially surrounding said artificial island.

2. The artificial island of claim 1 wherein said island includes attachment means for connecting ice booms, anchors, navigational aids and the like.

3. The artificial island of claim 1 wherein said island includes earth penetration spurs to provide additional anchor bearing for said island.

4. The artificial island of claim 1 wherein said island includes natural fill materials such as concrete, stone, gravel and the like in combination with said chemical composition.

5. The artificial island of claim 1 wherein said island includes flotation means to stabilize and help move said island into and out of its functional position.

6. The artificial island of claim 1 wherein said island includes an ice bumper to protect the encapsulating structure.

7. The artificial island of claim 1 wherein said encapsulating structure is formed from metal and resinous plastic materials.

8. A method for controlling movement of natural ice formations in natural or man-made bodies of water, comprising:
 a. providing at least one mobile artificial island having an encapsulating structure with a body cavity substantially filled with a liquid composition which freezes to form an ice-like solid at a temperature higher than that necessary for the formation of natural ice; and
 b. placing at least one such artificial island in a natural or man-made body of water in a position designed to control natural ice movement therein.

9. The method of claim 8 wherein said island includes attachment means for connecting ice booms, anchors, navigational aids and the like.

10. The method of claim 8 wherein wherein said island includes earth penetration spurs to provide additional anchor bearing for said island.

11. The method of claim 8 wherein said island includes natural fill materials such as concrete, stone, gravel and the like in combination with said liquid composition.

12. The method of claim 8 wherein said island includes flotation means to stabilize and help move said island into and out of its functional position.

13. The method of claim 8 wherein said island includes an ice bumper to protect the encapsulating structure.

14. The method of claim 8 wherein said encapsulating structure is formed from metal and resinous plastic materials.

\* \* \* \* \*